Oct. 8, 1940.  G. A. MERKT  2,217,518
COMBUSTION REGULATION
Filed July 6, 1938
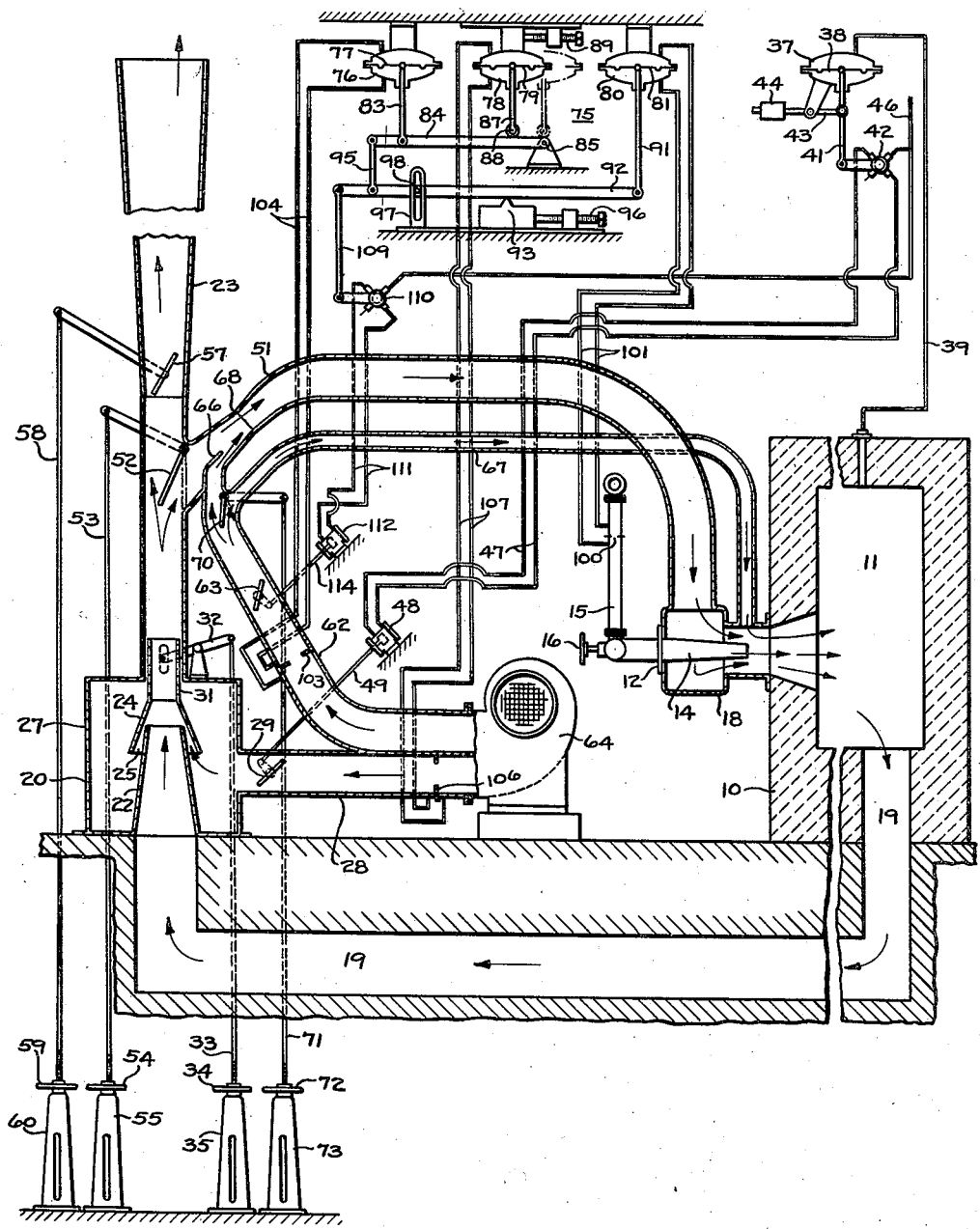
INVENTOR
GUSTAV A. MERKT, DEC'D
HELEN P. MERKT, ADMR., WITH THE WILL ANNEXED
BY
ATTORNEY Patented Oct. 8, 1940

2,217,518

UNITED STATES PATENT OFFICE 2,217,518

COMBUSTION REGULATION

Gustav A. Merkt, deceased, late of Worcester, Mass., by Helen P. Merkt, administratrix, Worcester, Mass., assignor to Morgan Construction Company, Worcester, Mass., a corporation of Massachusetts Application July 6, 1938, Serial No. 217,762

9 Claims. (Cl. 158—1)

This invention relates to combustion regulation, and more particularly to the regulation of combustion in furnaces having provision for the recirculation of a portion of the gaseous products of combustion.

It has been proposed heretofore to withdraw the gases from a furnace by means of an ejector utilizing an air blast, and to return a portion of these gases to the furnace for the purpose of controlling the furnace temperature and the characteristics of the flame. In order to control the pressure in the furnace, it is customary to adjust the draft at the furnace outlet by regulating the quantity of air which is supplied to the ejector. Since this regulation varies the relative proportions of air and inert gases in the mixture leaving the ejector, and since a part of this mixture is returned to the furnace and provides a portion of the air required to support the combustion therein, the ratio of the quantities of fuel and air supplied to the furnace is changed and combustion conditions are disturbed in an undesirable manner.

It is accordingly one object of the invention to overcome these difficulties and to provide a method and apparatus whereby the total quantity of air supplied for combustion purposes to a furnace of the recirculating type may be regulated as desired or maintained substantially constant irrespective of variations in the quantity of air utilized for ejection purposes and the resultant variations in the air content of the recirculated gaseous mixture.

It is a further object of the invention to provide a method and apparatus whereby a predetermined fuel-air ratio may be obtained in a furnace of the recirculating type irrespective of variations in the rate of fuel supply or in the quantity of air utilized for ejection purposes.

It is a further object of the invention to provide a comparatively simple and reliable combustion regulating system for a recirculating furnace, the improved system including a provision for adjustment of the quantity of ejected gases which is recirculated, as compared to the total quantity of such gases, and including adjustable means to compensate for the effect of the first mentioned adjustment on the fuel-air ratio.

With these and other objects in view, as will be apparent to those skilled in the art, the invention resides in the combination of parts and the steps of the process set forth in the specification and covered by the claims appended hereto.

Referring to the drawing illustrating one embodiment of the invention and in which like reference numerals indicate like parts, the single figure is a somewhat diagrammatic view of a furnace and associated combustion regulating system, certain parts being shown in section.

The embodiment illustrated comprises a furnace 10 having a combustion chamber 11 in which fuel may be burned in suspension. The fuel is delivered to the chamber 11 through a burner 12 mounted on the front wall of the furnace and comprising a central nozzle 14 to which a suitable fuel, such as gas or oil, is supplied through a pipe 15 provided with a flow-regulating valve 16. The nozzle 14 is surrounded by a casing 18 from which air may be discharged rearwardly into the combustion chamber 11 in surrounding relation to the fuel stream. The gaseous products of combustion are withdrawn from the rear portion of the combustion chamber through an exit duct 19 by means of an ejector 20.

The ejector 20 comprises an upwardly directed converging nozzle 22 communicating at its lower end with the duct 19 and located directly beneath an upright stack 23. The upper portion of the nozzle 22 is surrounded by an upwardly directed converging nozzle 24 which is spaced from the nozzle 22 to provide an annular passage 25 through which a blast of air may be directed upwardly, this air serving to entrain the gases from the duct 19 and to discharge them through the stack to the atmosphere. In order to provide this air blast, the nozzles 22 and 24 are enclosed in a casing 27 to which air is supplied under pressure through a duct 28 having an adjustable damper 29 therein. In some cases it may be desirable to adjust the area of the annular passage 25, and for this purpose the nozzle 24 is shown formed with a cylindrical upward extension 31 which is slidable vertically in the lower end of the stack. This extension 31 is connected by a lever 32 and rod 33 to a manually adjustable handwheel 34 mounted on a stand 35, the rod being screw-threaded through the handwheel.

The pressure in the combustion chamber 11 is preferably controlled automatically by adjustment of the damper 29 which regulates the supply of the ejector air. For this purpose there is provided a regulator 37 comprising a flexible diaphragm 38 to which the combustion chamber pressure is transmitted through a pipe 39. This diaphragm is connected by a rod 41 to a suitable four-way pilot valve 42. A lever 43 having a weight 44 slidably adjustable thereon is connected to the rod 41 to provide a loading for the diaphragm. A suitable pressure fluid is supplied through a pipe 46 to the pilot valve 42, and the valve is connected by means of two pipes 47 to a fluid motor 48 having a piston rod 49 connected to the damper 29. It will be clear that the slightest variation in the pressure in the combustion chamber 11 will cause the diaphragm 38 to move the pilot valve in one direction or the other from its neutral position, thus admitting pressure fluid to the motor 48, which in turn will adjust the damper 29 and alter the supply of ejector air as may be required to restore the desired furnace pressure. These parts are so arranged that the supply of ejector air is varied directly with respect to the furnace pressure, i. e. if the furnace pressure increases, the supply of ejector air is increased and vice versa.

In order to control the temperature in the combustion chamber and the characteristics of the flame, it is proposed to return to the furnace a portion of the gases which lead the ejector 20. For this purpose a duct 51 is provided which branches laterally from the lower portion of the stack 23 and leads to the casing 18 of the burner 12. At the junction of the stack and the duct 51 there is mounted a splitting valve 52 which is connected by a rod 53 to a manually adjustable handwheel 54 mounted on a stand 55, the rod being screw-threaded through the handwheel. By rotating the handwheel, the valve 52 can be swung to different positions, thereby varying the portion of the gases which is diverted and recirculated through the furnace. If desired, a damper 57 may be mounted in the stack 23 above the valve 52. This damper is connected by a rod 58 to a manually adjustable handwheel 59, which is supported on a stand 60 and screw-threaded to the rod 58, so that the damper may be readily adjusted from a convenient point.

The gases which pass from the stack 23 into the recirculating duct 51 will contain a portion of the air which has been delivered through the nozzle 24 for ejection purposes, and this purpose of the ejector air which is thus recirculated will be utilized in supporting the combustion of the fuel. However additional air will be required to complete the combustion. Furthermore it may be found difficult in some cases to obtain a sufficient recirculation of the gases merely by adjustment of the damper 52. For these reasons an auxiliary air duct 62 is provided, with an adjustable damper 63 therein. Air is supplied under pressure to this duct by means of a fan 64, and this same fan is shown delivering air to the ejector air duct 28, but it will be obvious that separate fans may be provided if desired. The auxiliary air duct 62 is arranged to supply air both to an injector nozzle 66 and to a branch duct 67. The injector nozzle 66 is mounted in the recirculating duct 51 adjacent a slight restriction or throat 68 formed therein, this nozzle being arranged to discharge a jet of air through the throat and thereby entrain the gases and increase the flow of gases through the duct. The branch duct 67 is connected to the burner casing 18 at a point somewhat in the rear of the recirculating duct 51. At the junction of the auxiliary air duct 62 and the branch duct 67 there is provided a splitting valve 70 whereby the auxiliary air may be divided in desired proportions between the injector nozzle 66 and the branch duct. This valve 70 is connected by a rod 71 to a manually adjustable handwheel 72 screw-threaded to the rod and mounted on a stand 73.

It will now be clear that with the construction as so far described the regulator 37 will actuate the damper 29 and vary the quantity of ejector air supplied through the duct 28, as may be required to maintain a predetermined pressure in the combustion chamber 11. Such variation in the ejector air supply will change the composition of the gaseous mixture leaving the ejector 20, and since a portion of this mixture is delivered through the duct 51 to the burner 12, the quantity of air supplied for combustion of the fuel will be varied and combustion conditions will be upset unless steps are taken to maintain a proper fuel-air ratio. Preferably the damper 63 in the auxiliary air duct 62 is controlled as may be necessary to ensure a correct total supply of combustion air, and this control is preferably effected automatically by means of a suitable regulator 75 which is arranged to balance the supplies of fuel and combustion air in the proper ratio.

The regulator 75 comprises a casing 76 having a flexible diaphragm 77 therein, a casing 78 having a flexible diaphragm 79 therein, and a casing 80 having a flexible diaphragm 81 therein. The diaphragm 77 is connected by a rod 83 to a lever 84 having a fulcrum 85, and the diaphragm 79 is connected to a rod 87 having a roller 88 on its lower end which engages the lever 84 between the rod 83 and the fulcrum 85. The casing 78 may be moved by means of a screw 89 to vary the position of the roller 88 along the lever. The diaphragm 81 is connected by a rod 91 to a lever 92 having a fulcrum 93. The levers 84 and 92 are substantially parallel, and they are connected by a link 95. The fulcrum 93 can be adjusted along the lever 92 by means of a screw 96, longitudinal movement of the lever being prevented by means of a slotted guide 97 which engages a pin 98 on the lever. The fuel supply pipe 15 is provided with a restriction in the form of an orifice plate 100, and pipes 101 serve to transmit to the diaphragm 81 the pressure differential produced by the flow through this plate. An orifice plate 103 is mounted in the auxiliary air duct 62, and the differential pressure produced thereby is transmitted to the diaphragm 77 through pipes 104. An orifice plate 106 is mounted in the ejector air duct 28, and pipes 107 transmit the differential pressure produced thereby to the diaphragm 79. The lever 92 of the regulator 75 is connected by a link 109 to a suitable four-way pilot valve 110 which is supplied with pressure fluid by the pipe 46, and this valve is connected by two pipes 111 to a fluid motor 112 having a piston rod 114 connected to the damper 63.

The operation of the invention will now be apparent from the above disclosure. Fuel is delivered to the burner 12 through the pipe 15, the rate of flow being controlled by adjustment of the valve 16 either manually or by any well-known automatic means. The gaseous products of combustion are withdrawn from the furnace through the duct 19 by the action of the ejector 20 to which air is supplied through the duct 28 by means of the fan 64. The mixture of ejector air and inert gases flows upwardly into the stack 23 and is divided by the splitting valve 52 into two portions, one portion continuing upwardly to be discharged into the atmosphere from the top of the stack and the other portion passing through the duct 51 to the burner casing 18. The fan 64 also supplies auxiliary air through the duct 62, and this air is divided by the splitting valve 70 into two portions, one portion passing through the nozzle 66 into the duct 51 to aid in maintaining a desired rate of gas flow therein and the other portion passing through the duct 67 to the burner casing 18. The inert gases which are delivered to the burner through the duct 51 serve to lower the furnace temperature and to prevent too rapid combustion, while the air which is mixed with these gases, in conjunction with the air which is supplied through the duct 67, serves to support the combustion of the fuel.

The regulator 37 will respond to any change in the pressure in the combustion chamber 11, as transmitted through the pipe 39 to the diaphragm 38, and this will actuate the pilot valve 42 and admit fluid from the pipe 46 to one end or the other of the motor 48, which will move the damper 29 and change the rate of flow of the ejector air until the desired furnace pressure is restored. The furnace pressure can be easily adjusted by sliding the weight 44 along the lever 43 to change the loading of the diaphragm 38. The diaphragm 77 is subjected to a downward force which is a function of the rate of air flow in the auxiliary air duct 62, and the diaphragm 79 is subjected to a downward force which is a function of the rate of air flow in the ejector air duct, and consequently of the rate at which air enters the duct 51 from the stack 23. These two forces are both applied to the lever 84 and tend to depress this lever, thus transmitting a downward force through the link 95 to the left hand portion of the lever 92. At the same time the diaphragm 81 is subjected to a downward force which is a function of the rate of fuel flow through the pipe 15 to the burner, and this force is transmitted through the link 91 to the right hand end of the lever 92. Normally the lever 92 is in equilibrium, and the pilot valve 110 is in neutral position. If however the flow of ejector air in the duct 28 should be altered by the action of the regulator 37 on the damper 29, the force on the diaphragm 79 will be changed, throwing the lever 92 out of balance and causing the pilot valve 110 to admit fluid to the motor 112. This will change the position of the damper 63 and adjust the flow of auxiliary air in the duct 62 inversely with respect to the supply of ejector air until the lever 92 has been restored to a balanced condition by the resultant change in the force on the diaphragm 77. In this manner a proper supply of combustion air may be maintained regardless of changes in the ejector air flow. Similarly if the rate of combustion is altered by adjustment of the valve 16, the force applied to the diaphragm 81 will be changed and the lever 92 thrown out of balance until the damper 63 has moved sufficiently to effect the proper change in the supply of combustion air and at the same time change the force on the diaphragm 77 sufficiently to restore the lever 92 to a balanced condition. The fuel-air ratio may be adjusted at any time merely by shifting the fulcrum 93, since this will change the lengths of the moment arms to which the forces corresponding to fuel flow and combustion air flow are applied respectively.

Probably the splitting valve 52 will be adjusted very infrequently, but if its position is altered this will change the supply of combustion air to the burner, since a different portion of the mixture of ejector air and inert gases will be directed into the duct 51. In order to compensate for this it is merely necessary to adjust the casing 78 and the roller 88 along the lever 84 by means of the screw 89, thereby changing the distance between the roller and the fulcrum 85. This will upset the balance of the lever 92 until the damper 63 has moved sufficiently to restore the correct combustion air supply and at the same time changed the force on the diaphragm 77 until the lever is again in balance. If the valve 52 is adjusted to reduce the quantity of recirculated gases, the roller 88 should be moved nearer to the fulcrum 85, and vice versa, in order that the fuel-air ratio may be held substantially constant throughout the operating range. Obviously the screw 89 and the valve 52 might be connected by any suitable means whereby they could be adjusted simultaneously, but this is believed to be unnecessary in the usual installation.

It will now be apparent that the invention provides a novel method and apparatus whereby an air blast may be utilized to eject the hot gases from a furnace, and a portion of the mixture may be returned to the furnace to control the furnace temperature and the characteristics of the flame. The quantity of ejection air may be varied to control the furnace pressure, and this will change the air content of the recirculated gases, and yet the fuel-air ratio is maintained substantially constant by effecting a compensating change in the supply of auxiliary air. Nevertheless the fuel-air ratio can readily be adjusted if a change occurs in the character of the fuel or other operating conditions which would render such adjustment desirable. Furthermore, any desired proportion of the ejected gaseous mixture can be recirculated, and the fuel-air ratio may still be maintained substantially constant throughout the operating range. Adjustments in the rate of fuel burning and in the furnace pressure can be made at any time in a simple manner without upsetting the proper balance between the supplies of fuel and air.

Having thus described the invention, what is claimed as new and desired to be secured by Letters Patent is:

1. The method of regulating combustion in a furnace comprising the steps of burning fuel in a furnace, supplying ejector air to entrain the gaseous products of combustion and effect their withdrawal from the furnace, returning to the furnace a portion of the mixture of ejector air and gaseous products of combustion, supplying auxiliary air to the furnace, varying the supply of ejector air directly with respect to the pressure in the furnace, and varying the supply of auxiliary air inversely with respect to the supply of ejector air.

2. The method of regulating combustion in a furnace comprising the steps of supplying fuel to a furnace for combustion therein, supplying ejector air to entrain the gaseous products of combustion and effect their withdrawal from the furnace, returning to the furnace a portion of the mixture of ejector air and gaseous products of combustion, supplying auxiliary air to the furnace, varying the supply of ejector air directly with respect to the pressure in the furnace, and varying the supply of auxiliary air inversely with respect to the supply of ejector air and directly with respect to the supply of fuel.

3. The method of regulating combustion in a furnace comprising the steps of burning fuel in a furnace, supplying ejector air to entrain the gaseous products of combustion and effect their withdrawal from the furnace, supplying auxiliary air to the furnace, utilizing the portion of the auxiliary air to entrain a portion of the mixture of ejector air and gaseous products of combustion and effect the return thereof to the furnace, varying the supply of ejector air directly with respect to the pressure in the furnace, and varying the supply of auxiliary air inversely with respect to the supply of ejector air.

4. A combustion regulating system for a furnace to which fuel is supplied for combustion therein comprising an ejector connected to the furnace, means to supply ejector air to the ejector and thereby entrain the gaseous products of combustion and effect their withdrawal from the furnace, means to return to the furnace a portion of the mixture of ejector air and gaseous products of combustion, means to supply auxiliary air to the furnace, means to vary the supply of ejector air directly with respect to the pressure in the furnace, and means to vary the supply of auxiliary air inversely with respect to the supply of ejector air.

5. A combustion regulating system for a furnace comprising means to supply fuel to the furnace for combustion therein, an ejector connected to the furnace, means to supply ejector air to the ejector and thereby entrain the gaseous products of combustion and effect their withdrawal from the furnace, means to return to the furnace a portion of the mixture of ejector air and gaseous products of combustion, means to supply auxiliary air to the furnace, means to vary the supply of ejector air directly with respect to the pressure in the furnace, and means to vary the supply of auxiliary air inversely with respect to the supply of ejector air and directly with respect to the supply of fuel.

6. A combustion regulating system for a furnace to which fuel is supplied for combustion therein comprising an ejector connected to the furnace, means to supply ejector air to the ejector and thereby entrain the gaseous products of combustion and effect their withdrawal from the furnace, means to supply auxiliary air to the furnace, means utilizing a portion of the auxiliary air to entrain a portion of the mixture of ejector air and gaseous products of combustion and return the same to the furnace, means to vary the supply of ejector air directly with respect to the pressure in the furnace, and means to vary the supply of auxiliary air inversely with respect to the supply of ejector air.

7. A combustion regulating system for a furnace to which fuel is supplied for combustion therein comprising an ejector connected to the furnace, means to supply ejector air to the ejector and thereby entrain the gaseous products of combustion and effect their withdrawal from the furnace, means to return to the furnace a portion of the mixture of ejector air and gaseous products of combustion, means to supply auxiliary air to the furnace, an automatic regulator responsive to changes in the pressure in the furnace and arranged to control the supply of ejector air directly with respect to the said pressure, and an automatic regulator responsive to changes in both the rate of flow of the auxiliary air and the rate of flow of the ejector air and arranged to control the supply of auxiliary air inversely with respect to the supply of ejector air.

8. A combustion regulating system for a furnace comprising means to supply fuel to the furnace for combustion therein, an ejector connected to the furnace, means to supply ejector air to the ejector and thereby entrain the gaseous products of combustion and effect their withdrawal from the furnace, means to return to the furnace a portion of the mixture of ejector air and gaseous products of combustion, means to supply auxiliary air to the furnace, an automatic regulator responsive to changes in the pressure in the furnace and arranged to control the supply of ejector air directly with respect to the said pressure, and an automatic regulator responsive to changes in the rate of flow of the auxiliary air, the rate of flow of the ejector air and the rate of supply of the fuel and arranged to control the supply of auxiliary air inversely with respect to the supply of ejector air and directly with respect to the supply of fuel.

9. A combustion regulating system for a furnace comprising means to supply fuel to the furnace for combustion therein, an ejector connected to the furnace, means to supply ejector air to the ejector and thereby entrain the gaseous products of combustion and effect their withdrawal from the furnace, adjustable means to divide the mixture of ejector air and gaseous products of combustion into two portions, means to return one of said portions to the furnace, means to supply auxiliary air to the furnace, means to vary the supply of ejector air and thereby control the pressure conditions in the furnace, an automatic regulator responsive to changes in the rate of flow of the auxiliary air and the rate of flow of the ejector air and arranged to control the supply of auxiliary air inversely with respect to the supply of ejector air, and means associated with said automatic regulator to vary the effect thereon of changes in the supply of ejector air so that the regulator may be adjusted to compensate for adjustments in the division of the said mixture.

HELEN P. MERKT,
*Administratrix with the Will Annexed of the Estate of Gustav A. Merkt, deceased.*